United States Patent [19]

Greene

[11] Patent Number: 5,411,143
[45] Date of Patent: May 2, 1995

[54] APPARATUS FOR THE MAGNETIC TREATMENT OF FLUIDS

[76] Inventor: Don Greene, 1395 S. Atlantic Ave. #2, Cocoa Beach, Fla. 32931

[21] Appl. No.: 164,471
[22] Filed: Dec. 9, 1993
[51] Int. Cl.6 .............................................. C02F 1/48
[52] U.S. Cl. ................................. 210/222; 210/695
[58] Field of Search ..................... 210/222, 223, 695; 96/1, 2

[56] References Cited

U.S. PATENT DOCUMENTS 4,519,919  5/1985  Whyte et al. ....................... 210/222

FOREIGN PATENT DOCUMENTS 1089058  4/1984  U.S.S.R. ............................. 210/222

Primary Examiner—Matthew O. Savage
Attorney, Agent, or Firm—Malloy & Malloy

[57] ABSTRACT

An apparatus for the magnetic treatment of fluids including a fluid conduit with an upstream end and a downstream end, an upstream, attracting pair of magnetic sources disposed in confronting relation to one another on opposite exterior sides of the fluid conduit at the upstream end thereof, and a downstream, repelling pair of magnetic sources disposed in confronting relation to one another on opposite exterior sides of the fluid conduit at a downstream end thereof, the downstream pair of magnetic sources being spaced a predetermined distance from the upstream pair of magnetic sources and being offset substantially 90 degrees from the upstream pair of magnetic sources relative to a central axis of fluid conduit.

9 Claims, 1 Drawing Sheet

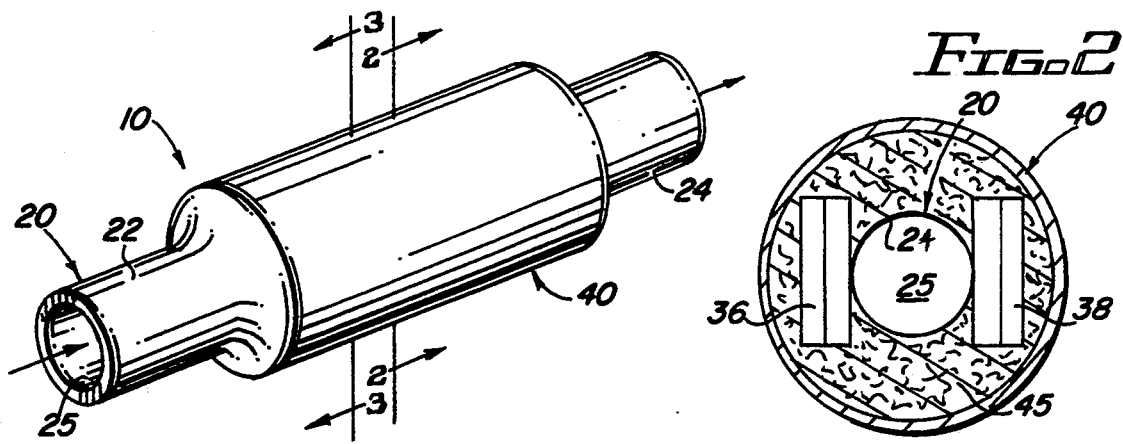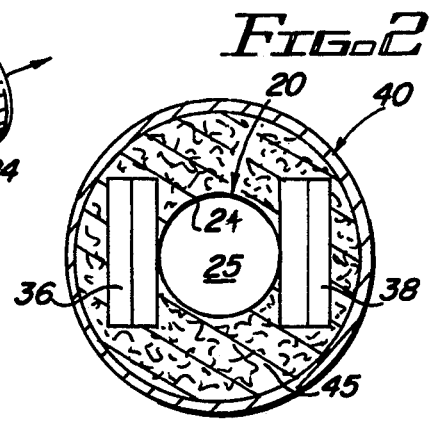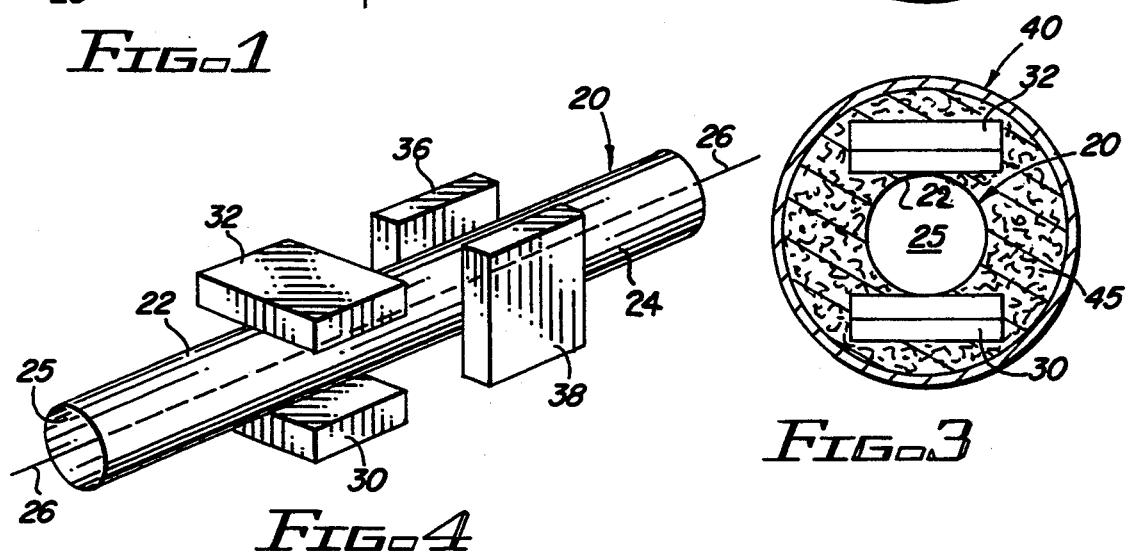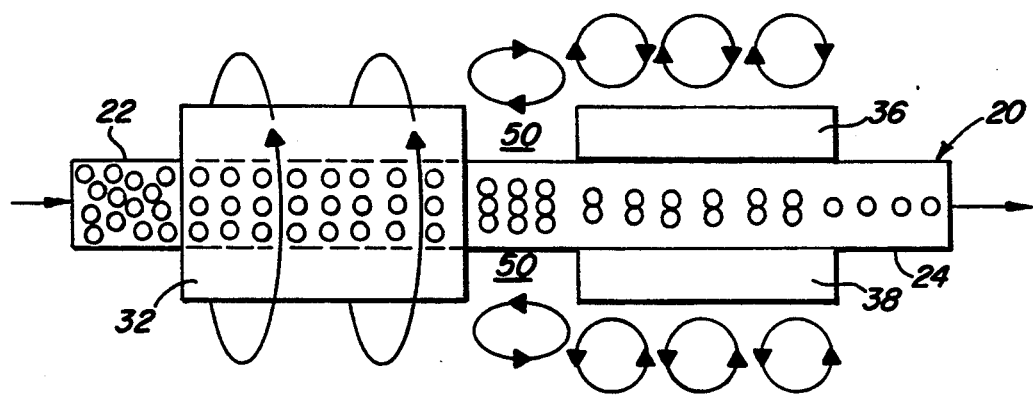

APPARATUS FOR THE MAGNETIC TREATMENT OF FLUIDS

BACKGROUND OF THE INVENTION

1. Field of the Invention

The present inventions relates to an apparatus for the magnetic treatment of fluid which is structured to align minerals contained within a fluid flow stream such that the treated fluid will be purified and will have increased productivity in processes which utilizes the fluid.

2. Description of the Related Art

The general concept of magnetically treating fluids is widely known and has been readily used for extended periods of time. Such wide spread use is evidence through the substantial number of patents relating to the magnetic treatment of fluids. These patents include the references to McGrath, et al, U.S. Pat. No. 5,024,759, Walsh, U.S. Pat. No. 4,836,932, Huntley, U.S. Pat. No. 5,221,471, Kulish, U.S. Pat. No. 4,605,498, Mach, U.S. Pat. 4,167,480, Van Gorp, U.S. Pat. No. 4,407,719 and O'Meara, U.S. Pat. No. 4,417,984. All of these referenced patents utilize magnets either in a water stream or disposed around a fluid conduit through which the water will pass. However, due to the complex nature of magnetic fields and the supreme importance of the orientation of magnets relative to a water flow, the devices of the prior art are limited in their degree of effectiveness due to the structure and orientation of the magnets which they employ. As a result, there is still a need for an apparatus which will magnetically treat fluids, especially water, so as to increase the efficient and effective use of the fluid well beyond accepted levels.

The device of the present invention is structured with magnetic sources in a specific orientation and configuration relative to a fluid flow path so as to achieve substantially unexpected and effective results regarding the treatment of water and other fluids such as natural gas. In the area of technology relating to magnetic fields and the like the precise structure and orientation of magnetic sources is crucial with each varying configuration providing very different results, the results being viewed through the properties exhibited by the treated fluid during use. No device of the related art includes the configuration recited in the present invention.

SUMMARY OF THE INVENTION

The present invention is directed towards an apparatus for the magnetic treatment of fluids. The apparatus is based around a fluid conduit which has an upstream end, downstream end and a central flow through path which defines a central axis of the fluid conduit. Disposed about the fluid conduit are an upstream pair of magnetic sources and a downstream pair of magnetic sources. The upstream pair of magnetic sources includes a first and a second magnetic sources which are disposed on opposite exterior sides of the fluid conduit at the upstream end thereof. These first and second magnetic sources are disposed in confronting relation to one another and are structured to attract each other. The downstream pair of magnetic sources includes a third and fourth magnetic sources which are also disposed on an opposite exterior size of the fluid conduit, but at the downstream end of the fluid conduit. The third and fourth magnetic sources are disposed in confronting relation to one another and are structured to repel one another. Although both the upstream pair and the downstream pair of magnetic sources are disposed about the fluid conduit, the pairs are offset substantially 90 degrees from one another relative to the central axis of the fluid conduit. Further, the upstream pair of magnetic sources is spaced a pre-determined distance from the downstream pair of magnetic sources, both pairs being disposed relative to one another such that during the passage of a fluid, especially water, through the fluid conduit, the minerals within the fluid will align themselves in a center of a flow stream of the fluid which exits the fluid conduit.

It is a primary object of the present invention to provide an apparatus for the magnetic treatment of fluids which will effectively align minerals contained within a fluid in a center of a flow stream of the fluid.

A further object of the present invention is to provide an apparatus for the magnetic treatment of fluid which will magnetically treat natural gas passing therethrough such that the amount of natural gas required to produce a certain number of BTU's is greatly reduced.

Another object of the present invention is to provide an apparatus for the magnetic treatment of fluids which will magnetically treat water passing therethrough such that the water may be utilized to form concrete having a substantially increased strength relative to concrete made with untreated water.

Another object of the present invention is to provide an apparatus for the magnetic treatment of fluids which will significantly reduce scale build up related to the fluid flow.

BRIEF DESCRIPTION OF THE DRAWINGS

For a fuller understanding of the nature of the present invention, reference should be had to the following detailed description taken in connection with the accompanying drawings in which:

FIG. 1 is a perspective view of the apparatus for the magnetic treatment of fluids;

FIG. 2 is cross sectional view along line 2—2 of FIG. 1 of the apparatus;

FIG. 3 is a cross sectional view along line 3—3 of FIG. 1 of the apparatus;

FIG. 4 is an exploded perspective view of the apparatus illustrating the position of the magnetic sources;

FIG. 5 is a top plan view of the apparatus illustrating the produced magnetic fields and the mineral alignment within a fluid passing through the apparatus of the present invention;

Like reference numerals refer to like parts throughout the several views of the drawings.

DETAILED DESCRIPTION OF THE PREFERRED EMBODIMENT

Shown throughout FIGS. 1-5, the present invention is directed towards an apparatus for the magnetic treatment of fluids, generally indicated as 10. The apparatus 10 includes primarily a fluid conduit 20 with an upstream end 22 and downstream end 24. Included as part of the fluid conduit is a central flow through path 25 which defines a central axis, illustrated by line 26 of FIG. 4, of the fluid conduit 20. Disposed about the fluid conduit 20 are a plurality of magnetic sources. These magnetic sources, which are adapted to produce select magnetic fields, include an upstream pair of magnetic sources and downstream pair of magnetic sources.

Specifically, the upstream pair of magnetic sources includes a first magnetic source 30 and a second magnetic source 32. These first and second magnetic sources 30 and 32 are disposed on opposite exteriors sides of the fluid conduit 20 at the upstream end 22. As best seen in FIGS. 3 and 4, the first and second magnetic sources 30 and 32 include first and second magnetic pole faces 30', 32', respectively, disposed in directly confronting relation to one another, sandwiching the fluid conduit 20 therebetween. The first and second magnetic pole faces 30' and 32' are of opposite polarity so as to attract one another. Accordingly, in a preferred embodiment one of the first and second magnetic pole faces 30' and 32' is a north pole and the other is a south pole.

The downstream pair of magnetic sources includes a third a fourth magnetic sources 36 and 38. These third and fourth magnetic sources 36 and 38 include third and fourth magnetic pole faces 36', 38', respectively, disposed on opposite exterior sides of the fluid conduit 20, so as to sandwich it therebetween, but are positioned at the downstream end of the fluid conduit 20. The third and the fourth magnetic pole faces 36' and 38' are also positioned in confronting relation to one another, and are of like polarity so as to repel one another, with both the third and fourth magnetic sources 36 and 38 being of a like polarity. Preferably, both the third and the fourth magnetic pole faces 36' and 38' are north poles.

While both the upstream pair of the magnetic sources 30 and 32 and the downstream pair of magnetic sources 36 and 38 are disposed to sandwich the fluid conduit 20, the downstream pair of magnetic sources 36 and 38 is offset substantially 90 degrees from the upstream pair of magnetic sources 30 and 32, relative to the central axis 26 of the fluid conduit 20. As illustrated in the figures, one pair will have a generally vertical orientation relative to a generally horizontal orientation of the other pair. Further, the upstream pair of magnetic sources 30 and 32 are spaced a predetermined distance from the downstream pair of magnetic sources 36 and 38. Preferably this gap is one inch, which as detailed in FIG. 5 results in a void, as at 50, which further functions to align minerals within the fluids.

The magnetic sources of the present invention, each include one, but preferably a plurality of individual magnets which are stacked with one another as illustrated in FIGS. 2 and 3. These magnets are preferably ceramic magnets, the polarity of the stacked magnets being the same so as to function to increase the strength from that particular magnetic source. Turning to FIG. 5, the upstream magnetic sources 30 and 32, due to their attracting nature form a magnetic field which encircles the magnets and the fluid conduit 20. Passage of a fluid through the upstream magnetic sources 30 and 32 results in an organization of the minerals within the fluid into an ordered array rather than the completely random configuration present when the fluid first enters the apparatus 10 of the present invention. After passing through the upstream magnetic sources 30 and 32 the fluid passes through the void as at 50, formed in the gap between the upstream magnetic sources 30 and 32 and the downstream magnetic sources 36 and 38. Due to the relative positioning of the magnets, opposing vortexes are formed at the void 50. The result of the positioning of these voids is that the minerals, which have been aligned, compress together at the central axis 26, further spacing themselves from the walls of the fluid conduit 20. Finally the fluid passes through the downstream magnetic sources 36 and 38. The repelling magnetic sources 36 and 38 form magnetic fields along an exterior side of the magnetic sources 36 and 38, as evidenced in FIG. 5. Passage through the downstream magnetic sources 36 and 38 serves to further compress an align the minerals within the fluid such that upon exiting the fluid conduit 20 the minerals are aligned in center of the flow stream of the fluid and away from the walls of the fluid conduit. This alignment in the center of the flow stream works to significantly reduce scale build up and the like. Specifically, the apparatus of the present invention treats the fluid, and in particular water, in such a manner that water which has passed through the apparatus 10, when utilized for mixing concrete, results in concrete having an increase in compressive strength of 50% over concrete made with non-treated water. Known methods of treating fluid were only able to achieve substantially small increases in compressive strength relative to the increases capable utilizing the apparatus 10 of the present invention. Further, fluids, such as natural gas, when treated by the apparatus become purified to the point that less quantities need to be burned to produce the same BTU's. Specifically with natural gas, treating the gas through the apparatus of the present invention results in an increased efficiency requiring between 20% and 24% less natural gas than if untreated gas was used. The beneficial results of treating fluids in such a manner as by the apparatus 10 of the present invention are surprisingly and substantially greater than what can be achieved utilizing known apparatus and methods of magnetically treating fluids.

Turning to FIGS. 1–3 the magnetic sources are held in place about the fluid conduit 20, preferably utilizing a high density two part Foam 45. Because of the attracting and repellent forces of the magnets, the magnets will tend to move away from the desired orientation. Accordingly, the foam 45 functions to secure the magnetic sources in their appropriate position about the fluid conduit 20. Further, gaps between magnets are filled with the foam 45, thereby further preventing sliding movement of the magnetic sources. Also, a rigid casing 40 and tapered ends are disposed about the foam 45 and the magnetic sources to provide further containment.

Now that the invention has been described.

What is claimed is:

1. An apparatus for the magnetic treatment of fluids comprising:

a fluid conduit including an upstream end, a downstream end, and a central flow through path defining a central axis of said fluid conduit, an upstream pair of magnetic sources, said upstream pair of magnetic sources including a first magnetic source and a second magnetic source disposed on opposite exterior sides of said fluid conduit at said upstream end thereof, said first magnetic source including a first pole face and said second magnetic source including a second pole face, said first and second magnetic pole faces being of opposite polarity and disposed in confronting relation to one another so as to attract one another, a downstream pair of magnetic sources, said downstream pair of magnetic sources including a third magnetic source and a fourth magnetic source disposed on opposite exterior sides of said fluid conduit at said downstream end thereof, said third magnetic source including a third pole face and said fourth magnetic source including a fourth pole face, said third and forth pole faces being of like polarity and disposed in confronting relation to one another so as to repel one another, said upstream pair of magnetic sources and said downstream pair of magnetic sources being offset substantially 90° from one another, relative to said central axis of said fluid conduit, and said upstream pair of magnetic sources and said downstream pair of magnetic sources being spaced a predetermined distance from one another and being disposed relative to one another such that minerals within a fluid passing through said fluid conduit align themselves in a center of a flow stream of the fluid exiting said fluid conduit.

2. An apparatus as recited in claim 1 wherein said predetermined distance which said upstream pair of magnetic sources is spaced from said downstream pair of magnetic sources is about one inch.

3. An apparatus as recited in claim 2 wherein said third pole face is a north pole and said fourth pole face is a north pole.

4. An apparatus as recited in claim 3 wherein said first pole face source is a north pole and said second pole face is a south pole.

5. An apparatus as recited in claim 1 wherein each of said magnetic sources includes at least one magnet.

6. An apparatus as recited in claim 5 wherein each of said magnets is a ceramic magnet.

7. An apparatus as recited in claim 1 further including securing means structured and disposed to maintain said upstream pair of magnetic sources and said downstream pair of magnetic sources in position about said fluid conduit despite the natural magnetic tendencies of said upstream pair of magnetic sources to attract one another and said downstream pair of magnetic sources to repel one another.

8. An apparatus as recited in claim 7 wherein said securing means includes a high density two part foam which encases said upstream pair of magnetic sources and said downstream pair of magnetic sources therein.

9. An apparatus as recited in claim 8 wherein said securing means includes a rigid casing which encases said upstream pair of magnetic sources and said downstream pair of magnetic sources between said fluid conduit and said rigid casing.

* * * * *